United States Patent
Kammerer

(10) Patent No.: US 6,592,304 B1
(45) Date of Patent: Jul. 15, 2003

(54) METHOD FOR TIPPING A CUTTER HEAD OF AN END-MILLING CUTTER

(75) Inventor: Karl Kammerer, Fluorn-Winzeln (DE)

(73) Assignee: Betek Bergbau-und Hartmetalltechnik Karl-Heinz Simon GmbH & Co. KG, Aichhalden (DE)

( * ) Notice: Subject to any disclaimer, the term of this patent is extended or adjusted under 35 U.S.C. 154(b) by 0 days.

(21) Appl. No.: 09/583,223

(22) Filed: May 30, 2000

(30) Foreign Application Priority Data

May 28, 1999 (DE) .......................................... 199 24 683

(51) Int. Cl.⁷ .............................. B23B 27/22; B23P 15/28
(52) U.S. Cl. ........................ 407/119; 407/118; 403/268
(58) Field of Search ................................ 407/118, 119; 75/236, 238, 230; 403/268; 428/216, 697, 698, 701, 469, 334, 335

(56) References Cited

U.S. PATENT DOCUMENTS

| | | | | |
|---|---|---|---|---|
| 2,101,376 A | * | 12/1937 | Voigtlander | 175/420.1 |
| 4,017,480 A | * | 4/1977 | Baum | 428/601 |
| 4,200,159 A | * | 4/1980 | Peschel et al. | 175/329 |
| 4,462,293 A | * | 7/1984 | Gunzner | 83/835 |
| 4,743,137 A | * | 5/1988 | Bucher et al. | 403/268 |
| 4,867,025 A | * | 9/1989 | Eklof et al. | 83/835 |
| 5,131,481 A | * | 7/1992 | Smith | 407/119 X |
| 5,242,511 A | * | 9/1993 | Yokoyama et al. | 148/430 |
| 5,569,000 A | * | 10/1996 | Littecke et al. | 407/114 |
| 6,138,779 A | * | 10/2000 | Boyce | 175/374 |
| 6,372,346 B1 | * | 4/2002 | Toth | 428/325 |

FOREIGN PATENT DOCUMENTS

JP 06187846 A * 7/1994 .......... H01B/11/06

* cited by examiner

*Primary Examiner*—Henry W. H. Tsai
(74) *Attorney, Agent, or Firm*—Pauley Petersen Kinne & Erickson

(57) ABSTRACT

A method for tipping a cutter head of an end-milling cutter with a hard alloy material, and an end-milling cutter tipped with a hard alloy material. To equip the cutter head with particularly wear-resistant and impact-resistant hard alloy materials, the hard alloy material has particles of hard alloy melted carbide, which are linked together by a bonding agent, for example a solder.

17 Claims, 1 Drawing Sheet

METHOD FOR TIPPING A CUTTER HEAD OF AN END-MILLING CUTTER

BACKGROUND OF THE INVENTION

1. Field of the Invention

This invention relates to a method for tipping a cutter head of an end-milling cutter with a hard alloy material. This invention also relates to an end-milling cutter for a coal cutting, road cutting or mining machine having a cutter head tipped with a hard alloy material.

2. Description of Related Art

Conventionally, a hard alloy material for end-milling cutters has a sintered material, with components of tungsten, carbide and cobalt. The sintered hard alloy elements can be inserted into a receiver of the cutter head and soldered into it.

SUMMARY OF THE INVENTION

It is one object of this invention to provide a method for tipping a cutter head of an end-milling cutter with a hard alloy material, by which an end-milling cutter is simply produced, with which especially wear-resistant and tough hard alloy materials can be developed.

It is another object of this invention to provide an end-milling cutter of the type mentioned above but with a tip, made of hard alloy material, distinguished by a high degree of wear-resistance and toughness.

In accordance with a method of this invention, a hard alloy material in the form of a bulk material is introduced into a receiver of the cutter head, and hollow spaces formed between the particles of hard alloy material are filled, at least partially, with a bonding agent, which links the hard alloy particles. With this type of end-milling cutter manufacture, tipping with a hard alloy material occurs in situ, by means of which a low cost and effective production run is achieved.

It is also possible by the method of this invention to match the material of the hard alloy particles and the bonding agent to each other. Thus it is possible to establish the toughness of the hard alloy material by the bonding agent, and to establish the wear resistance of the hard alloy material by the hard alloy particles. Depending on the intended use, it is possible to match properties of the material by varying the material of the hard alloy particles and the bonding agent, as well as by varying the proportions of the components.

In accordance with a preferred embodiment of this invention, a soldering powder is added to the hard alloy material as the bonding agent. The soldering powder is changed into a molten state by means of the action of heat.

Thus, overall in the molten state the bonding agent developed as a solder is taken up by capillary action into the hollow spaces formed between the hard alloy particles. A very even distribution of the solder can thus be achieved. One prerequisite is that appropriate capillary cross sections are available in the bulk material by means of the surface geometry and/or the size of the hard alloy particles.

Extremely wear-resistant hard alloy materials can be realized if $WC/W_2C$ mixed carbides are introduced into the receiver of the cutter head as the hard alloy particles. To be able to develop particularly impact-resistant structures, a copper filler material, for example a cupreous manganese solder, is introduced as a bonding agent into the hollow spaces formed between the hard alloy particles.

An end-milling cutter of this invention can be distinguished by the hard alloy material that has particles of hard alloy melted carbide, which are linked together by a bonding agent. The particles of hard alloy melted carbide have a particularly great wear resistance. $WC/W_2C$ mixed carbides in particular can be used as particles of hard alloy melted carbide. These can be linked to each other by a solder matrix made of cupreous manganese.

If the proportion of the particles of hard alloy melted carbide in the hard alloy material is 60 to 90%, particularly impact-resistant structures can be produced because of the high proportion of bonding agent.

The hard alloy material can form a cutter tip of the cutter head and/or a wear-protection element for the cutter head of the end-milling cutter in accordance with this invention.

BRIEF DESCRIPTION OF THE DRAWINGS

This invention is explained in greater detail by preferred embodiments represented in the drawings, wherein.

DESCRIPTION OF PREFERRED EMBODIMENTS

Figure 1:
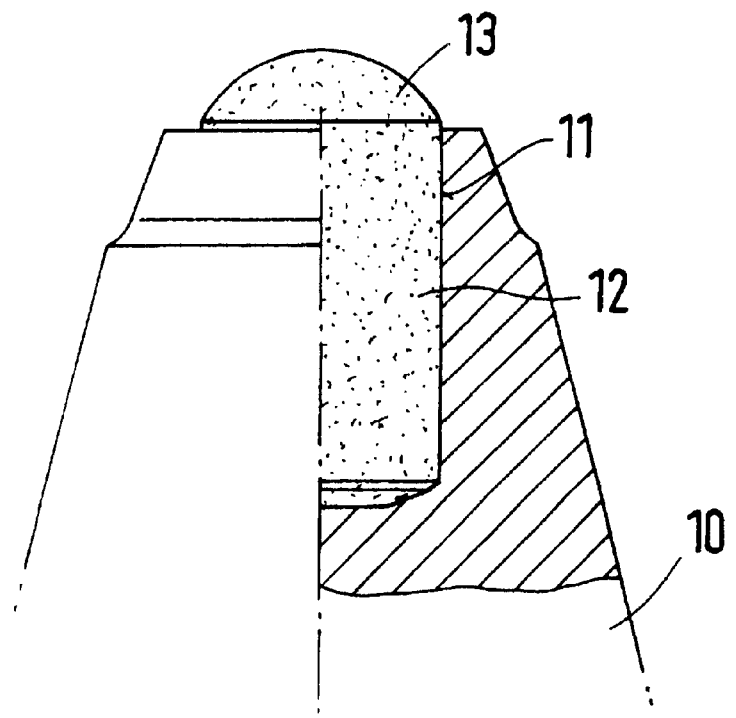
FIG. 1 shows a partial sectional side view of a cutter head of a round-shaft cutter with a cutter tip inserted into the cutter head.

A cutter head 10 of a round-shaft cutter is shown in FIG. 1. Round-shaft cutters of this type are used to cut floor coverings, in particular road surfaces. The variation represented in FIG. 1 can be used for cutting concrete. A receiver 11 is cut into the cutter head 10. The receiver 11 receives a cutter tip 12. The cutter tip 12 projects with a work section 13 past the cutter head 10. In the present example, the work section is concavely designed. To produce the cutter tip, a bulk material of $WC/W_2C$ mixed carbides is filled into the receiver 11. A hood-shaped cover is placed on the cutter head 10 for shaping the work section 13. Then a cupreous manganese soldering powder is inserted into an inlet opening of the hood-shaped cover and is changed into the molten form by induction. The solder flows into the hollow spaces formed between the $WC/W_2C$ mixed carbides by the action of gravity. Depending on the geometry of the hollow spaces, the penetration of the liquid solder into the structure of the hollow spaces is aided by a capillary effect. It is also possible to mix the solder powder directly with the $WC/W_2C$ mixed carbides in order to achieve an even distribution of the solder. Preferably the proportion of $WC/W_2C$ mixed carbides is 70 to 80% of the material of the cutter tip 12. The remainder is formed by the cupreous manganese solder matrix. This high proportion of the matrix leads to particularly impact-resistant structures with a simultaneously high wear resistance.

Figure 2:
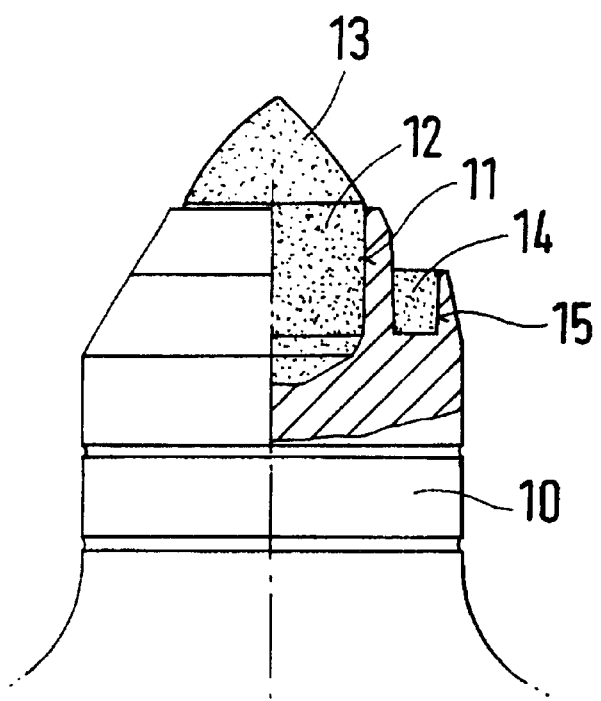
FIG. 2 shows a partial sectional side view of a cutter head of a round-shaft cutter with a cutter tip inserted and with an additional wear-protection element.

A further embodiment of this invention is shown in FIG. 2. The cutter tip 12 of this round-shaft cutter is not made in situ, as in FIG. 1, but as a separate component. This separate component can be inserted into the receiver 11 of the cutter head 10 and fixed in place, for example by soldering. The cutter tip 12 is also made of $WC/W_2C$ mixed carbides, which are linked to each other by a cupreous manganese soldering matrix.

The cutter head 10 of this round-shaft cutter is equipped with a wear-protection element 14 in addition to the cutter tip 12. An annular, peripheral receiver 15 is cut, for this purpose, into the cutter head 10. The receiver 15 is also filled with a hard alloy material of $WC/W_2C$ mixed carbides and cupreous manganese. Similar to FIG. 1, the wear-protection element 14 can be made in situ or as a separate element, which is subsequently installed in the receiver 15.

What is claimed is:

1. A method for tipping a cutter head of an end-milling cutter with a hard alloy material, comprising:

introducing a cutter tip (12) into a receiver (11) of the cutter head (10), wherein the cutter tip (12) is of the hard alloy material which has hollow spaces formed between particles of the hard alloy material; and filling the hollow spaces of the cutter tip (12) with a bonding agent by using capillary action to take tip the bonding agent into the hollow spaces and evenly distributing the bonding agent within an entire body of the cutter tip (12) and around the entire outside surface of the cutter tip (12) to link the hard alloy particles that they are in, and to integrate the cutter tip (12) and the cutter head (10).

2. The method in accordance with claim 1, further comprising adding a soldering powder as the bonding agent to the hard alloy material, and heating the soldering powder into a molten state.

3. The method in accordance with claim 2, further comprising drawing the soldering powder in the molten state by capillary action into hollow spaces formed between the hard alloy particles.

4. The method in accordance with claim 3, wherein the hard alloy particles are $WC/W_2C$ mixed carbides.

5. The method in accordance with claim 4, wherein the bonding agent is a copper filler material.

6. The method in accordance with claim 1, wherein the bonding agent is drawn in a molten state by capillary action into the hollow spaces.

7. The method in accordance with claim 1, wherein the hard alloy particles are $WC/W_2C$ mixed carbides.

8. The method in accordance with claim 1, wherein the bonding agent is a copper filler material.

9. The method in accordance with claim 1, wherein a first proportion of the hard alloy particles in the hard alloy material is 60% to 90%, and a remaining proportion in the hard alloy material is of the bonding agent.

10. In an end-milling cutter for one of a coal cutting machine, a road cutting machine and a mining machine having a cutter head tipped with a hard alloy material, the improvement comprising:

a cutter tip (12) introduced into a receiver (11) of the cutter head, the cutter tip (12) made of the hard alloy material having hollow spaces formed between particles of the hard alloy material, and a bonding agent filling the hollow spaces of the cutter tip (12) by taking up the bonding agent into the hollow spaces by capillary action to evenly distribute the bonding agent within an entire body of the cutter tip (12) and around the entire outside surface of the cutter tip (12) to link the hard alloy particles that they are in, and to integrate the cutter tip (12) and the cutter head (10).

11. The end-milling cutter in accordance with claim 10, wherein $WC/W_2C$ mixed carbides form particles of the hard alloy material.

12. The end-milling cutter in accordance with claim 11, wherein the bonding agent is a soldering material of a cupreous manganese solder.

13. The end-milling cutter in accordance with claim 12, wherein a proportion of the particles of the hard alloy material is 60% to 90% by weight.

14. The end-milling cutter in accordance with claim 13, wherein the cutter head (10) has a wear-protection element (14).

15. The end-milling cutter in accordance with claim 10, wherein the bonding agent is a soldering material of a cupreous manganese solder.

16. The end-milling cutter in accordance with claim 10, wherein a proportion of the particles of the hard alloy material is 60% to 90% by weight.

17. The end-milling cutter in accordance with claim 10, wherein the cutter head (10) has a wear-protection element (14).

* * * * *